(12) United States Patent
Yoshikawa

(10) Patent No.: US 11,214,506 B2
(45) Date of Patent: Jan. 4, 2022

(54) SUSPENSION STRUCTURE AND SUSPENSION METHOD FOR OPTICAL FIBER PREFORM AND MANUFACTURING METHOD AND SUSPENSION METHOD FOR OPTICAL FIBER

(71) Applicant: SUMITOMO ELECTRIC INDUSTRIES, LTD., Osaka (JP)

(72) Inventor: Satoshi Yoshikawa, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 33 days.

(21) Appl. No.: 16/498,490

(22) PCT Filed: Mar. 29, 2018

(86) PCT No.: PCT/JP2018/013308
§ 371 (c)(1),
(2) Date: Sep. 27, 2019

(87) PCT Pub. No.: WO2018/181739
PCT Pub. Date: Oct. 4, 2018

(65) Prior Publication Data
US 2021/0053863 A1    Feb. 25, 2021

(30) Foreign Application Priority Data
Mar. 31, 2017    (JP) .............................. JP2017-071516

(51) Int. Cl.
*G03B 37/00*     (2021.01)
*C03B 37/027*    (2006.01)
(Continued)

(52) U.S. Cl.
CPC .......... *C03B 37/027* (2013.01); *C03B 37/029* (2013.01); *H01S 3/094* (2013.01)

(58) Field of Classification Search
CPC ...... G02B 37/027; G02B 37/029; H01S 3/094
(Continued)

(56) References Cited

U.S. PATENT DOCUMENTS 4,410,344 A * 10/1983 Iyengar ............... C03B 37/0253
118/672
4,820,322 A * 4/1989 Baumgart ............. C03B 23/076
65/412

(Continued)

FOREIGN PATENT DOCUMENTS

| CN | 204675997 U | 9/2015 |
| CN | 106477876 A | 3/2017 |
| JP | H05-147967 A | 6/1993 |

*Primary Examiner* — Kaveh C Kianni
(74) *Attorney, Agent, or Firm* — Faegre Drinker Biddle & Reath LLP

(57) ABSTRACT

A suspension structure of the present embodiment conveys an optical fiber preform into a drawing furnace. A suspension portion formed in a depressed shape or a projected shape or as a hole is formed in a dummy rod connected on an upper side of the optical fiber preform conveyed into the drawing furnace. The suspension structure includes: a joining mechanism configured to cover at least a part of circumference of the dummy rod and include an arm that extends on both sides in a direction perpendicular to a drawing direction and a retention portion that engages with the suspension portion and retains the optical fiber preform; and an engagement mechanism including a gripping portion with which the arm engages and which hangs the optical fiber preform.

15 Claims, 11 Drawing Sheets

(51) Int. Cl.
  *C03B 37/029* (2006.01)
  *H01S 3/094* (2006.01)

(58) Field of Classification Search
  USPC .......................................................... 385/125
  See application file for complete search history.

(56) References Cited

U.S. PATENT DOCUMENTS

| | | | | |
|---|---|---|---|---|
| 4,969,941 A * | 11/1990 | Kyoto | ....................... | F27B 5/10 65/391 |
| 5,152,818 A * | 10/1992 | Berkey | ............. | C03B 37/01217 385/126 |
| 5,259,856 A * | 11/1993 | Ohga | .................. | C03B 37/01446 65/423 |
| 5,417,399 A * | 5/1995 | Saito | ................. | C03B 37/01486 248/317 |
| 6,543,257 B1 * | 4/2003 | Koaizawa | ........... | C03B 37/0146 65/489 |
| 6,792,188 B2 * | 9/2004 | Libori | .................... | B82Y 20/00 385/125 |
| 7,174,078 B2 * | 2/2007 | Libori | ................ | G02B 6/02042 385/123 |
| 7,515,790 B2 * | 4/2009 | Choi | ...................... | B82Y 20/00 359/831 |
| 7,853,111 B2 * | 12/2010 | Noda | .................. | G02B 6/1225 385/129 |
| 8,661,857 B2 * | 3/2014 | Shimizu | ............ | C03B 37/01446 65/427 |
| 8,702,105 B2 * | 4/2014 | Otosaka | ................ | C03B 37/029 277/355 |
| 2002/0014094 A1 * | 2/2002 | Mikami | ............ | C03B 37/01486 65/500 |
| 2003/0000255 A1 * | 1/2003 | Kohmura | ............ | C03B 37/0146 65/384 |
| 2003/0205068 A1 * | 11/2003 | Taru | ...................... | C03B 37/029 65/537 |
| 2005/0066689 A1 * | 3/2005 | Eis | .................... | C03B 37/02736 65/381 |
| 2005/0092030 A1 * | 5/2005 | Balakrishnan | ...... | C03B 37/0142 65/421 |
| 2005/0213906 A1 * | 9/2005 | Ogura | ................ | B29D 11/00721 385/123 |
| 2009/0038345 A1 * | 2/2009 | Otosaka | ................ | C03B 37/029 65/424 |
| 2013/0333421 A1 * | 12/2013 | Hamaguchi | ....... | C03B 37/01257 65/377 |
| 2015/0321945 A1 * | 11/2015 | Okada | ..................... | C03C 25/12 65/435 |
| 2015/0329403 A1 * | 11/2015 | Adigrat | ............... | C03B 37/0126 65/421 |
| 2015/0336840 A1 * | 11/2015 | Adigrat | ................ | C03B 37/014 65/421 |
| 2016/0002090 A1 * | 1/2016 | Okazaki | ................ | C03B 37/029 65/435 |
| 2018/0265395 A1 * | 9/2018 | Cocchini | ............ | C03B 37/0124 |
| 2018/0282199 A1 * | 10/2018 | Cocchini | ........... | C03B 37/01473 |
| 2019/0263711 A1 * | 8/2019 | Grieco | ............. | C03B 37/01486 |
| 2020/0031706 A1 * | 1/2020 | Grieco | ................ | C03B 37/0146 |

\* cited by examiner

FIG.7A
FIG.7B
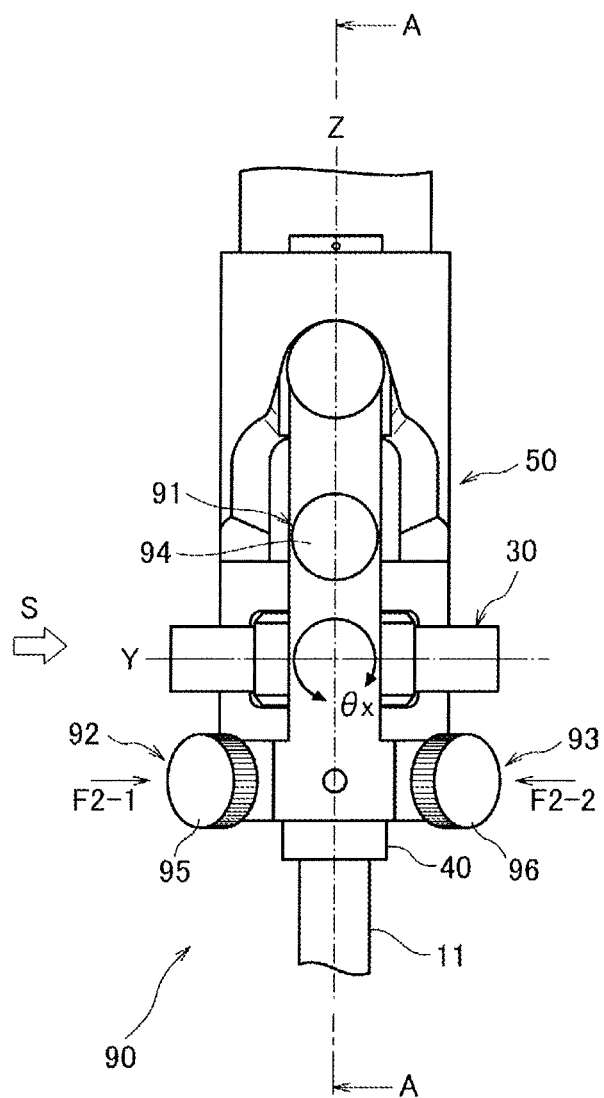
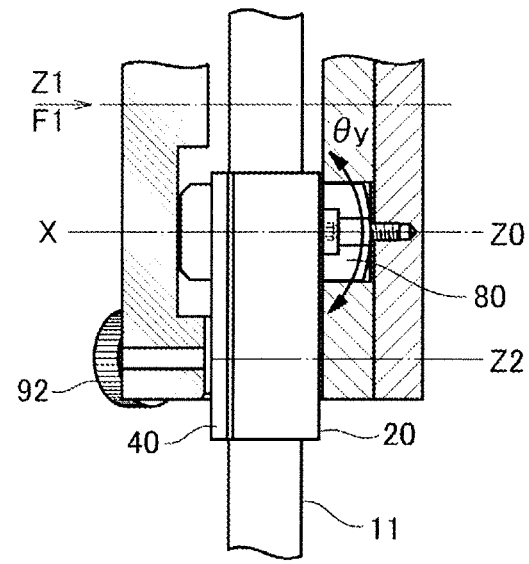

SUSPENSION STRUCTURE AND SUSPENSION METHOD FOR OPTICAL FIBER PREFORM AND MANUFACTURING METHOD AND SUSPENSION METHOD FOR OPTICAL FIBER

TECHNICAL FIELD

The present invention relates to a suspension structure and a suspension method for an optical fiber preform, and particularly to, a suspension structure and a suspension method conveying a glass base material for optical fiber to a drawing furnace at the time of manufacturing the optical fiber and a manufacturing method and a suspension method for an optical fiber.

BACKGROUND ART

When an optical fiber is manufactured, a glass base material for optical fiber (hereinafter referred to as "optical fiber preform") is transported near drawing furnace, is rebuilt on hanging mechanisms, and hung and supported in a furnace tube of the drawing furnace. Then, the inside of the drawing furnace is heat to fuse the optical fiber preform and perform drawing of the optical fiber.

To draw optical fibers with good quality, it is necessary to convey optical fiber preform into drawing furnace with high precision so that inclination or the like does not occur. However, space for setting optical fiber preform near drawing furnace is generally narrow and it is necessary to perform work in a state in which the drawing furnace is at high temperature to perform continuous drawing, and thus there is a problem that it takes some time to perform conveyance work or setting.

To solve such a problem, a suspension structure in which a connection member is included in a dummy rod supporting an optical fiber preform and the connection member and the optical fiber preform are stopped with a pin has been proposed (see Patent Literature 1 and particularly claim 3).

CITATION LIST

Patent Literature

Patent Literature 1; JP-A-H5-147967

SUMMARY OF INVENTION

Technical Problem

In the suspension structure proposed in Patent Literature 1, however, a connection tube is disposed in advance, a dummy rod is inserted into the connection tube, and a pin is inserted into a hole punched to be penetrated through both the dummy rod and the connection tube for fixing. Thus, there is a problem that work in which it takes some time to perform engagement of the connection tube and the dummy rod and insert the pin near a drawing furnace arises. In addition, since an optical fiber preform is hung and supported by only a pin, there is concern of the ping being deformed or damaged.

The invention is devised in view of such circumstances of the background and an object of the invention is to provide a suspension structure and a suspension method for conveying an optical fiber preform into a drawing furnace easily and reliably, and a manufacturing method of an optical fiber.

Solution to Problem

According to an embodiment of the invention, there is provided a suspension structure that conveys an optical fiber preform into a drawing furnace. A suspension portion formed in a depressed shape or a projected shape or as a hole is formed in a dummy rod connected on an upper side of the optical fiber preform conveyed into the drawing furnace.

The suspension structure includes: a joining mechanism configured to cover at least a part of circumference of the dummy rod and include an arm that extends on both sides in a direction perpendicular to a drawing direction and a retention portion that engages with the suspension portion and retains the optical fiber preform; and an engagement mechanism including a gripping portion with which the arm engages and which hangs the optical fiber preform.

According to another embodiment of the invention, there is provided a suspension method of conveying an optical fiber preform into a drawing furnace. The method includes: forming a suspension portion formed in a depressed shape or a projected shape or as a hole in a dummy rod connected on an upper side of the optical fiber preform conveyed into the drawing furnace; retaining the optical fiber preform by a joining mechanism configured to cover at least a part of circumference of the dummy rod and include an arm that extends on both sides in a direction perpendicular to a drawing direction and a retention portion that engages with the suspension portion and retains the optical fiber preform; and engaging the arm with an engagement mechanism including a gripping portion which hangs the optical fiber preform.

According to still another embodiment of the invention, there is provided a method of manufacturing an optical fiber. The method includes: suspending an optical fiber preform using the suspension structure; inserting the optical fiber preform into a drawing furnace; and heating and melting the optical fiber preform in the drawing furnace to draw an optical fiber.

Advantageous Effects of Invention

According to the invention, by providing the suspension structure and the suspension method for conveying an optical fiber preform into a drawing furnace easily and reliably, and a method of manufacturing an optical fiber, it is possible to improve productivity of optical fiber drawing work.

BRIEF DESCRIPTION OF DRAWINGS

FIGS. 7A and 7B are explanatory diagrams illustrating an overview of posture adjustment of an optical fiber preform (a dummy rod) according to the second embodiment of the invention.

DESCRIPTION OF EMBODIMENTS

Description of Embodiments of Present Invention

Figure 1:
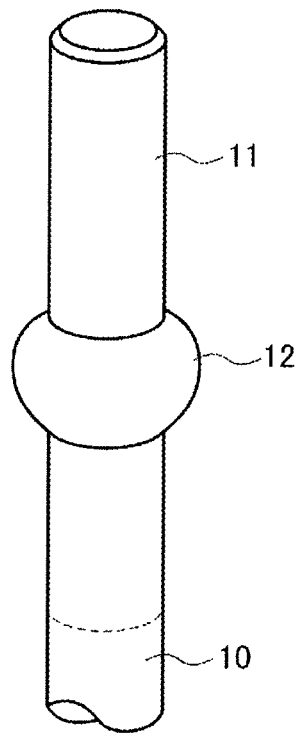
FIG. 1 is a perspective view illustrating an overview of a dummy rod on an upper side of an optical fiber preform according to a first embodiment of the invention.

First, embodiments of the invention will be listed and described.

(1) According to an embodiment of the invention, there is provided a suspension structure that conveys an optical fiber preform into a drawing furnace including a suspension portion formed in a depressed shape or a projected shape or as a hole is formed in a dummy rod connected on an upper side of the optical fiber preform conveyed into the drawing furnace; a joining mechanism configured to cover at least a part of circumference of the dummy rod and include an arm that extends on both sides in a direction perpendicular to a drawing direction and a retention portion that engages with the suspension portion and retains the optical fiber preform; and an engagement mechanism including a gripping portion with which the arm engages and which hangs the optical fiber preform.

According to the first embodiment, by retaining the optical fiber preform in the engagement mechanism including the arm using the suspension portion formed on the upper side of the optical fiber preform in advance, it is possible to engage with the joining mechanism using the arm with sufficient strength. Therefore, it is possible to easily perform work for conveying the optical fiber preform and it is possible to reliably dispose the optical fiber preform inside the drawing furnace. The suspension portion can be formed in a depressed shape or a projected shape, or as a hole. The suspension portion may not necessarily be a flat surface and may be a slope surface or a curved surface facing the lower side, and a retention portion may be provided to correspond to such a surface or a contact spot.

(2) In the suspension structure in (1), the suspension portion may have an annular projected or spherical shape formed uniformly on the dummy rod. The annular shape or the spherical shape may be fitted in the retention portion.

According to the embodiment, the suspension portion and the retention portion are at the same position at the time of engagement and are uniformly disposed on the circumference so that the hung optical fiber preform is stable. For example, at least, two portions may be provided to face each other or may be provided on the whole circumference. The suspension portion with a stepped difference shape can be formed to remain in the dummy rod in advance. Thus, by fitting the suspension portion with the annular shape or the spherical shape in the retention portion, it is possible to cause the optical fiber preform to easily engage and to hang the optical fiber preform stably. The projected annular shape or spherical shape may be any shape and, for example, a projected cross-section may be a semicircular shape and a rectangular shape.

(3) In the suspension structure in (1), the suspension portion may be a depressed groove formed uniformly on the dummy rod. The retention portion may be fitted in the groove.

According to the embodiment, the suspension portion and the retention portion are at the same position at the time of engagement and are uniformly disposed on the circumference so that the hung optical fiber preform is stable. For example, at least, two portions may be provided to face each other or may be provided on the whole circumference. The suspension portion with a groove shape can be formed by simply processing the dummy rod. Thus, by fitting the suspension portion in the retention portion, it is possible to cause the optical fiber preform to easily engage and hang the optical fiber preform stably.

(4) In the suspension structure in (1), the suspension portion may be a through hole. The through hole may be formed to be perpendicular to the drawing direction of the dummy rod connected on the upper side of the optical fiber preform conveyed into the drawing furnace. A guide hole communicating with the through hole may be formed in the arm. The retention portion may be a pin inserted into the through hole and the guide hole.

According to the embodiment, by using the through hole as the suspension portion and using the pin inserted into the through hole as the retention portion, it is possible to engage the joining mechanism with the through hole of the dummy rod connected on the upper side of the optical fiber preform in advance by the pin. Since the engagement mechanism can engage using the arms with sufficient strength in the configuration, it is possible to easily perform work for conveying the optical fiber preform and it is possible to reliably dispose the optical fiber preform inside the drawing furnace.

(5) In the suspension structure in any one of (1) to (4), the engagement mechanism may include an accommodation portion that is mounted at a lower end of the support rod hung in advance in the drawing furnace and accommodates a part of the joining mechanism with which the optical fiber preform engages. The gripping portion may include a placement portion in which the arm is placed and a locking portion which extends on both sides of the accommodation portion, of which a tip is formed in a key shape, and which locks the accommodated joining mechanism.

According to the embodiment, by including the adjustment portions at mutually different azimuth angles, it is possible to appropriately push and pull the optical fiber preform. Therefore, it is possible to adjust a posture of the optical fiber preform. That is, it is possible to stabilize a posture of the optical fiber preform and it is possible to minutely adjust an interval between the optical fiber preform and a lateral wall of the drawing furnace.

(6) In the suspension structure in any one of (1) to (5), lateral reception surface facing a lateral surface of the dummy rod may be formed in the engagement mechanism. A pivoting member that has projected surface with predetermined curvature in a direction perpendicular to the drawing direction may be mounted to be pivotable on the engagement mechanism so that the projected surface comes into contact with the lateral reception surface. A depressed optical fiber preform reception surface with curvature of a lateral circumferential surface of the joining mechanism or the dummy rod may be formed on a side facing a lateral side of the joining mechanism or the dummy rod of the pivoting member.

According to the embodiment, the pivoting member is configured to be interposed between the engagement mechanism and the optical fiber preform. The pivoting member is mounted so that the pivoting member does not fall from the engagement mechanism, but the pivoting member is pivotable with respect to the engagement mechanism in the mounting method. Since a projected surface with predetermined curvature in a direction perpendicular to the drawing direction is provided on the joining mechanism side or the dummy rod of the pivoting member, a pivoting range in the drawing direction can be large. Further, a depressed surface in accordance with the curvature of the cylindrical base material is provided on the optical fiber preform side of the pivoting member. When the optical fiber preform is conveyed into the drawing furnace, a closed state between the pivoting member and the optical fiber preform is realized by the depressed base material reception surface. Therefore, it is possible to maintain the stable retention state.

Since the closed pivoting member is pivotable in the optical fiber preform conveyed into the drawing furnace, as described above, it is possible to prevent an unusual posture such as a sloped state due to pivoting by an empty weight. It is not necessary to set the pivoting range exactly when there is a large curve or there is no unevenness in the dummy rod. By setting the projected surface of the pivoting member as a lateral circumferential surface in accordance with a circumferential curvature of the lateral reception surface of the engagement mechanism, it is possible to smooth a contact state of the engagement mechanism and the pivoting member.

(7) In the suspension structure in (6), the pivoting member may be inserted to be loosely fitted in the engagement mechanism.

According to the embodiment, for example, a stepped through hole of which a diameter on the lateral reception surface side is small is provided in a thickness direction from the optical fiber preform of the pivoting member to the lateral reception surface on which the pivoting member of the engagement mechanism is mounted, and the pivoting member is mounted on the engagement mechanism by a screw that has a head portion which is not disengaged from a small-diameter of the through hole. By mounting the pivoting member on the engagement mechanism in a loose fittable state, the optical fiber preform closed to the pivoting member is pivotable by a gap between a screw and a through hole and the pivoting member can be prevented from falling.

(8) The suspension structure in any one of (1) to (7) may further include a cover portion configured to cover the joining mechanism engaging with the engagement mechanism and to be installed in the engagement mechanism.

According to the embodiment, in addition to the foregoing embodiment, by including the cover portion that further covers the engagement mechanism and the joining mechanism, it is possible to reliably retain the optical fiber preform. Therefore, it is possible to prevent the optical fiber preform from falling due to a change in heat, vibration, or the like inside the drawing furnace.

(9) In the suspension structure in (8), the cover portion may include an enclosure portion facing a lateral surface of the optical fiber preform. The enclosure portion may include an adjustment portion that stretches in mutually different azimuth angle directions in the drawing direction and adjusts a posture of the optical fiber preform.

According to the embodiment, by including the adjustment portions at mutually different azimuth angles, it is possible to appropriately push and pull the optical fiber preform. Therefore, it is possible to adjust a posture of the optical fiber preform. That is, it is possible to stabilize a posture of the optical fiber preform and it is possible to minutely adjust an interval between the optical fiber preform and a lateral wall of the drawing furnace.

(10) In the suspension structure in (9), the adjustment portion may be disposed above or below the arm in the drawing direction.

According to the embodiment, for example, when the number of adjustment portions is 3, two adjustment portions are distributed above or below the arm connected to the upper side of the optical fiber preform and one adjustment portion is distributed below or above the arm. Thus, it is possible to easily adjust a slope of the drawing direction of the optical fiber preform.

(11) In the suspension structure in (9) or (10), at least three adjustment portions may be included and two of the adjustment portions may be disposed above or below the arm so that the adjustment portions have substantially right angled azimuth angles. The one adjustment portion may be disposed above or below the arm so that the adjustment portion has a substantially middle azimuth angle with respect to the two adjustment portions.

According to the embodiment, by including at least three adjustment portions and disposing two of the adjustment portions above or below the arm so that the adjustment portions have substantially right angled azimuth angles, it is possible to realize minute adjustment. By setting a disposition relation between two adjustment portions to be substantially right-angled, it is possible to guarantee easiness of adjustment work in the horizontal direction.

(12) In the suspension structure in any one of (9) to (11), the adjustment portion may be a screw movable in the azimuth angle direction by turning.

According to the embodiment, for example, a stepped through hole of which a diameter on the lateral reception surface side is small is provided in a thickness direction from the optical fiber preform of the pivoting member to the lateral reception surface on which the pivoting member of the engagement mechanism is mounted, and the pivoting member is mounted on the engagement mechanism by a screw that has a head portion which is not disengaged from a small-diameter of the through hole. By mounting the pivoting member on the engagement mechanism in a loose fittable state, the optical fiber preform closed to the pivoting member is pivotable by a gap between a screw and a through hole and the pivoting member can be prevented from falling.

(13) In the suspension structure in any one of (8) to (12), a buffer member may be included one or both of a side of the joining mechanism facing the engagement mechanism and a side of the cover facing the joining mechanism.

According to the embodiment, for example, it is possible to alleviate delivery of an impact at the time of conveyance of the optical fiber preform into the drawing furnace or vibration from the outside to the optical fiber preform. Therefore, it is possible to prevent damage or the like of the optical fiber preform and it is possible to prevent the optical fiber material from vibrating inside the drawing furnace.

(14) According to an embodiment of the invention, there is provided a suspension method of conveying an optical fiber preform into a drawing furnace. The method includes: forming a suspension portion formed in a depressed shape or a projected shape or as a hole in a dummy rod connected on an upper side of the optical fiber preform conveyed into the drawing furnace; retaining the optical fiber preform by a joining mechanism configured to cover at least a part of circumference of the dummy rod and include an arm that extends on both sides in a direction perpendicular to a drawing direction and a retention portion that engages with the suspension portion and retains the optical fiber preform; and engaging the arm with an engagement mechanism including a gripping portion which hangs the optical fiber preform.

According to the embodiment, by retaining the optical fiber preform in the joining mechanism including the arm using the suspension portion formed on the upper side of the optical fiber preform in advance, it is possible to engage with the engagement mechanism using the arm with sufficient strength. Therefore, it is possible to easily perform work for conveying the optical fiber preform and it is possible to reliably dispose the optical fiber preform inside the drawing furnace. The suspension portion and the retention portion are at the same position at the time of engagement and are uniformly disposed on the circumference so that the hung optical fiber preform is stable. For example, at least, two portions may be provided to face each other or may be provided on the whole circumference. The suspension portion may not necessarily be a flat surface and may be a slope surface or a curved surface facing the lower side, and a retention portion may be provided to correspond to such a surface or a contact spot.

(15) There is provided a method of manufacturing an optical fiber. The method includes: suspending an optical fiber preform using the suspension structure according to any one of (1) to (14); inserting the optical fiber preform into a drawing furnace; and heating and melting the optical fiber preform in the drawing furnace to draw an optical fiber.

According to the embodiment, since the work for conveying the optical fiber preform can be easily performed and the optical fiber preform can be reliably disposed inside the drawing furnace, it is possible to improve workability and productivity.

Details of Embodiments of the Invention

Next, preferred embodiments of a suspension structure and a suspension method for an optical fiber preform according to the invention will be described with reference to the drawings. In the following description, configurations to which the same reference signs are given in the different drawings are similar, and the description thereof will be omitted in some cases.

Description of First Embodiment of the Invention

Figure 2:
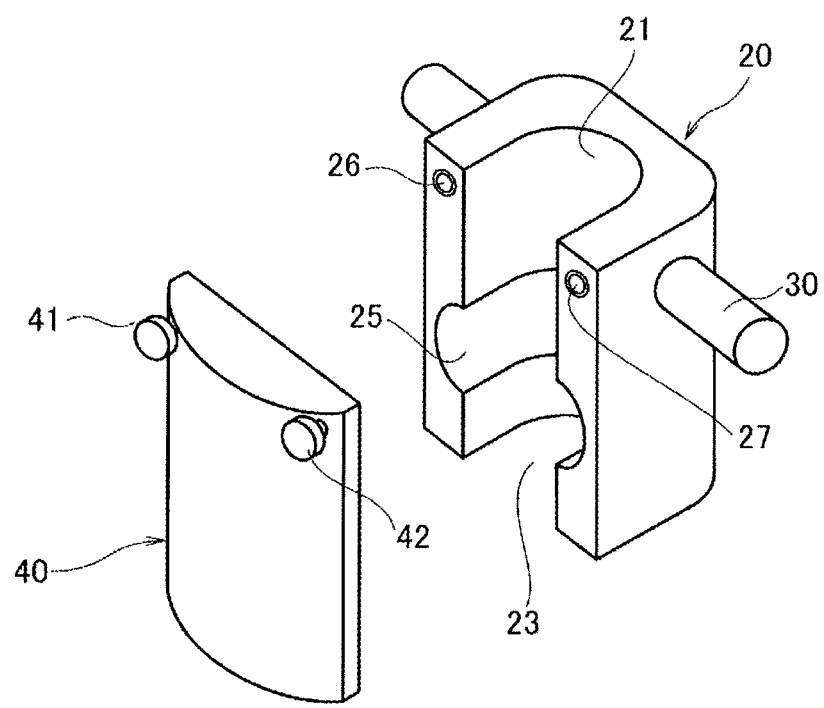
FIG. 2 is a perspective view illustrating an overview of an adaptor (a joining mechanism) according to the first embodiment of the invention.
Figure 3:
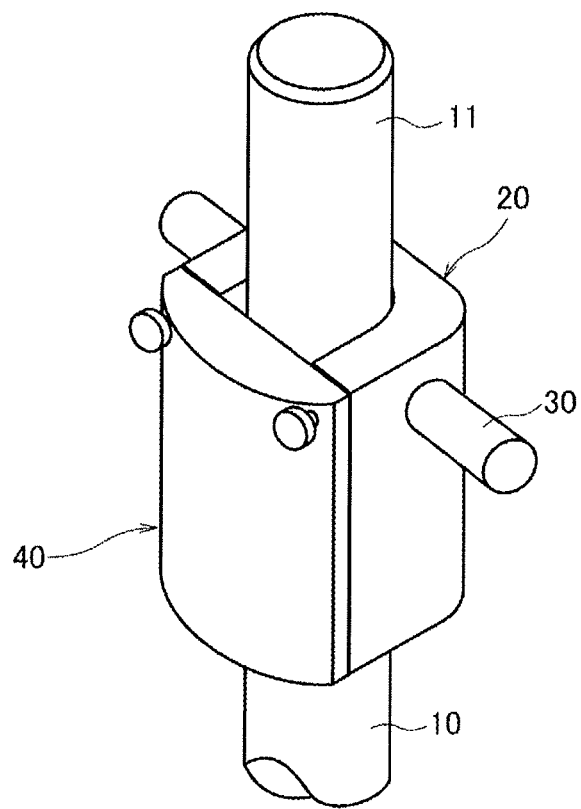
FIG. 3 is an explanatory diagram illustrating a state in which the adaptor (the joining mechanism) is mounted in the optical fiber preform (the dummy rod) according to the first embodiment of the invention.
Figure 4:
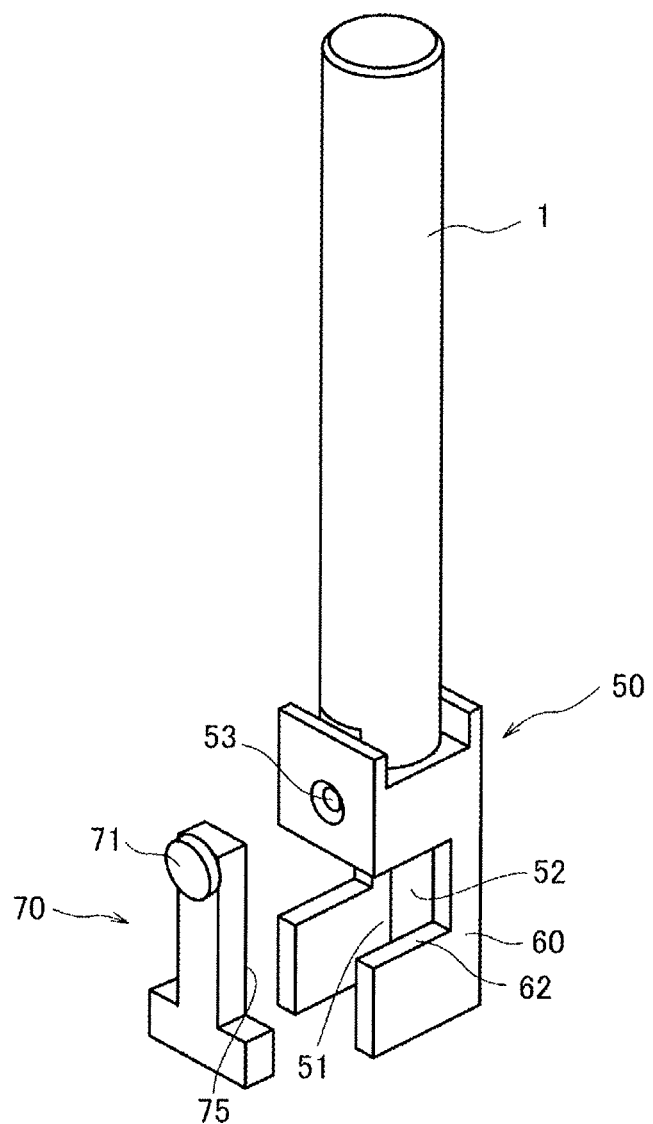
FIG. 4 is a perspective view illustrating an overview of a hanger (an engagement mechanism) and a cover according to the first embodiment of the invention.

FIG. 1 is a perspective view illustrating an overview of a dummy rod on an upper side of an optical fiber preform according to a first embodiment of the invention. FIG. 2 is a perspective view illustrating an overview of an adaptor (a joining mechanism) according to the first embodiment of the invention. FIG. 3 is an explanatory diagram illustrating a state in which the adaptor (the joining mechanism) is mounted in the optical fiber preform (the dummy rod) according to the first embodiment of the invention. FIG. 4 is a perspective view illustrating an overview of a hanger (an engagement mechanism) and a cover according to the first embodiment of the invention. In FIG. 3, to avoid complication, only reference signals necessary for description are written and FIGS. 1, 2, and 4 are referred to for details.

A suspension structure 100 according to the first embodiment of the invention includes an adaptor 20 (a joining mechanism) mounted in a dummy rod 11 which is connected on an upper side of an optical fiber preform 10 and a hanger 50 (an engagement mechanism) with which the adaptor 20 engages. A cover 70 (a cover portion) that covers the adaptor 20 and the dummy rod 11 after the dummy road 11 is accommodated in the hanger 50 may be included.

Referring to FIG. 1, the optical fiber preform 10 is conveyed into a drawing furnace at a posture at which the dummy rod 11 is located on the upper side. The dummy rod may not be made of the same glass as the optical fiber preform 10 or may be made of a metal, and thus a form appropriate for a manufacturing process can be appropriately selected.

In the dummy rod 11, an annular projection 12 (a suspension portion) is formed in a direction perpendicular to the vertical direction of FIG. 1. Any shape may be formed as long as a stepped difference occurs in the projected annulus. A projected cross-section as in FIG. 1 is not limited to a semicircular shape and a rectangular shape may be used. Further, the projected annulus may not be formed on the whole circumference and may be uniformly on the circumference. For example, the projected annulus may be formed at two parts at least to face each other.

Referring to FIG. 2, the adaptor 20 covers at least a part of circumference of the dummy rod 11 and includes an arm 30 extending on both sides in a direction perpendicular to a drawing direction and a retention portion 25 that engages with the annular projection 12 (the suspension portion) and retains the optical fiber preform 10. A lid 40 that prevents the optical fiber preform 10 from falling is mounted on the adaptor 20 after the dummy rod 11 is accommodated.

The arm 30 is a cylindrical member and engages with a gripping portion 60 of the hanger 50 when the adaptor 20 is accommodated in the hanger 50. The position of the arm 30 is disposed above the retention portion 25 in FIG. 2, but is not limited to a position above the retention portion 25. For example, the position of the arm 30 may be at the same height as the retention portion 25 or may be below the retention portion 25.

The adaptor 20 includes a dummy rod accommodation portion 21 that accommodates the dummy road 11 of the optical fiber preform 10 from a lateral surface. In the dummy rod accommodation portion 21, a curved surface that has an inner diameter substantially matching the outer diameter of the dummy rod 11 of the optical fiber preform 10 is formed. The curved surface is formed in, for example, a semicircular shape so that the dummy rod 11 of the optical fiber preform 10 enters the dummy rod accommodation portion 21 from an opening 23 and subsequently becomes stable to be accommodated. In the dummy rod accommodation portion 21, the retention portion 25 which is a depressed groove with the shape matching the annular projection 12 is formed.

After the dummy rod 11 is accommodated, the lid 40 is mounted on the adaptor 20 to prevent the optical fiber preform 10 from falling. The lid 40 is installed in mounting holes 26 and 27 of the adaptor 20 by locking screws 41 and 42. A mounting method by the locking screws is merely exemplary. Any mounting method may be used as long as the accommodated optical fiber preform 10 does not fall due to vibration or the like. For example, when the retention portion 25 is formed as a depressed groove lowered from the opening 23 to the rear in a direction in which the dummy rod 11 enters the dummy rod accommodation portion 21 and the annular projection 12 corresponding to the depressed groove is included, the optical fiber preform 10 can be prevented from falling due to vibration or the like and the lid 40 is not necessary in some cases.

The adaptor 20 and the lid 40 are manufactured with a material that endures a temperature environment on the drawing furnace. For example, a metal material such as an austenite-based stainless steel or Inconel can be applied. However, since a spot at which the adaptor 20 is disposed inside the drawing furnace is not at a high temperature at which glass is melted, a metal such as general stainless steel can also be used. The material is not limited to a metal and quartz or carbon can also be applied. The arm 30 extending on both sides may be mechanically processed with a metal to be integrated or may be mechanically combined.

A state in which the optical fiber preform 10 is mounted on the adaptor 20 will be described with reference to FIGS. 1 to 3. First, the adaptor 20 is moved toward the dummy rod 11 of the optical fiber preform 10. Subsequently, the annular projection 12 formed in the dummy rod 11 is fitted in the retention portion 25 of the adaptor 20 so that the dummy rod 11 is accommodated in the dummy rod accommodation portion 21. Thereafter, the lid 40 is installed in the mounting holes 26 and 27 of the adaptor 20 by the locking screws 41 and 42. Then, the optical fiber preform 10 engages with the adaptor 20 as in FIG. 3.

By engaging the dummy rod 11 with the adaptor 20 as in FIG. 3, the optical fiber preform 10 can be supported by the adaptor 20 with sufficient strength. Thus, it is possible to prevent falling or the like at the time of conveyance into the drawing furnace and maintain the stable state even in the drawing furnace. In this way, in the embodiment, it is possible to avoid a strength problem that occurs when the optical fiber preform 10 is supported by only a pin 32 as in Patent Literature 1.

Referring to FIG. 4, a support rod 1 is hung in advance in the drawing furnace and the hanger 50 is mounted at the lower end of the support rod 1. For example, the support rod 1 and the hanger 50 may be mechanically combined and or may be combined by welding or the like. For the support rod 1 and the hanger 50, a material can be appropriately selected in accordance with a heat environment inside the drawing furnace. For example, a metal material such as an austenite-based stainless steel or Inconel can be applied. However, since spots at which the support rod 1 and the hanger 50 are disposed inside the drawing furnace are not at a high temperature at which glass is melted, a metal such as general stainless steel can also be used.

The hanger 50 includes the gripping portion 60 that hangs the optical fiber preform 10 by engagement of the arm 30 of the adaptor 20 with which the dummy rod 11 of the optical fiber preform 10 engages and an accommodation portion 51 that accommodates the adaptor 20. A mounting hole 53 for mounting the cover 70 is punched above the accommodation portion 51.

The gripping portion 60 includes a placement portion 62 which extends on both sides of the accommodation portion 51 and on which the arm 30 is placed. A structure in which the tip of the placement portion 62 is formed in a key shape for locking so that the arm 30 does not fall may be used.

A lateral reception surface 52 that faces a lateral surface of the optical fiber preform 10 is formed in a direction in which the optical fiber preform 10 of the accommodation portion 51 is accommodated. Here, a buffer material such as a felt can also be disposed to alleviate an impact at the time of conveyance of the optical fiber preform 10.

The cover 70 covers the adaptor 20 engaging with the hanger 50 and is installed in the mounting hole 53 of the hanger 50 by a locking screw 71. For the cover 70, a material can be appropriately selected in accordance with a heat environment inside the drawing furnace. For example, a metal material such as an austenite-based stainless steel or Inconel can be applied. However, since a spot at which the cover 70 is disposed inside the drawing furnace is not at a high temperature at which glass is melted, a metal such as general stainless steel can also be used. The material is not limited to a metal and quartz or carbon can also be applied.

A buffer member 75 may be disposed on a side on which the cover 70 covers the adaptor 20. In this way, it is possible to suppress shaking occurring due to vibration of the optical fiber preform inside the drawing furnace.

Next, a procedure in which the optical fiber preform 10 with which the adaptor 20 engages is mounted on the support rod 1 inside the drawing furnace will be described. Referring to FIG. 4, the hanger 50 is mounted on the support rod 1 hung inside the drawing furnace and the optical fiber preform 10 with which the adaptor 20 including the arm 30 engages is moved toward the accommodation portion 51 of the hanger 50.

Thereafter, the optical fiber preform 10 with which the adaptor 20 engages is accommodated in the accommodation portion 51 of the hanger 50 and the arm 30 is placed on the placement portion 62.

Then, when the cover 70 is moved to cover the adaptor 20 engaging with the hanger 50, the cover 70 is mounted. Then, the cover 70 is installed in the mounting hole 53 of the hanger 50 by the locking screw 71. In this way, the adaptor 20 is fitted in the gripping portion 60, and thus the cover 70 is realized as a lid.

According to the first embodiment, by retaining the optical fiber preform 10 in the adaptor 20 (the engagement mechanism) including the arm 30 using the annular projection 12 (the suspension portion) formed on the upper side of the optical fiber preform 10 in advance, it is possible to engage with the engagement mechanism using the arm with sufficient strength. Therefore, it is possible to easily perform work for conveying the optical fiber preform and it is possible to reliably dispose the optical fiber preform inside the drawing furnace. Further, by including the cover 70 that covers the adaptor 20 after the cover 70 is mounted on the hanger 50, it is possible to prevent the optical fiber preform 10 from falling due to a change in heat, vibration, or the like inside the drawing furnace.

According to the first embodiment, by loading the arm 30 on a hook structure (a locking portion 61 and the placement portion 62) of the hanger 50, the optical fiber preform 10 with which the adaptor 20 engages can be conveyed to the accommodation portion 51. Therefore, it is possible to easily perform work for conveying the optical fiber preform 10 and it is possible to reliably dispose the optical fiber preform 10 inside the drawing furnace.

Since the work for conveying the optical fiber preform can be easily performed and the optical fiber preform can be reliably disposed inside the drawing furnace, it is possible to improve workability and productivity.

Description of Second Embodiment of the Invention

Figure 5:
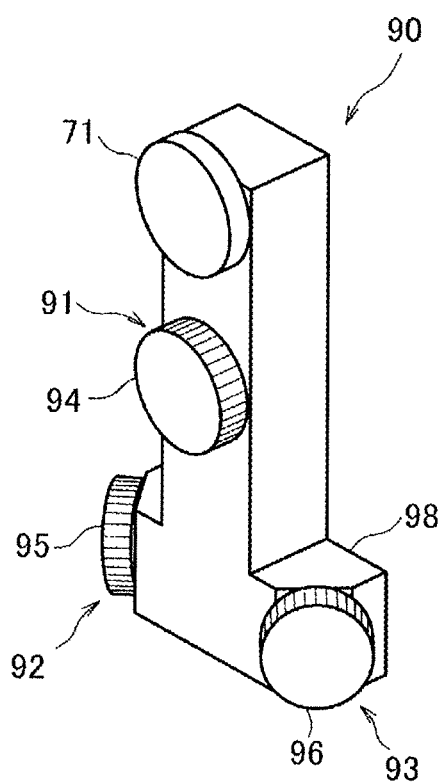
FIG. 5 is a perspective view illustrating an overview of a cover according to a second embodiment of the invention.
Figure 6A:
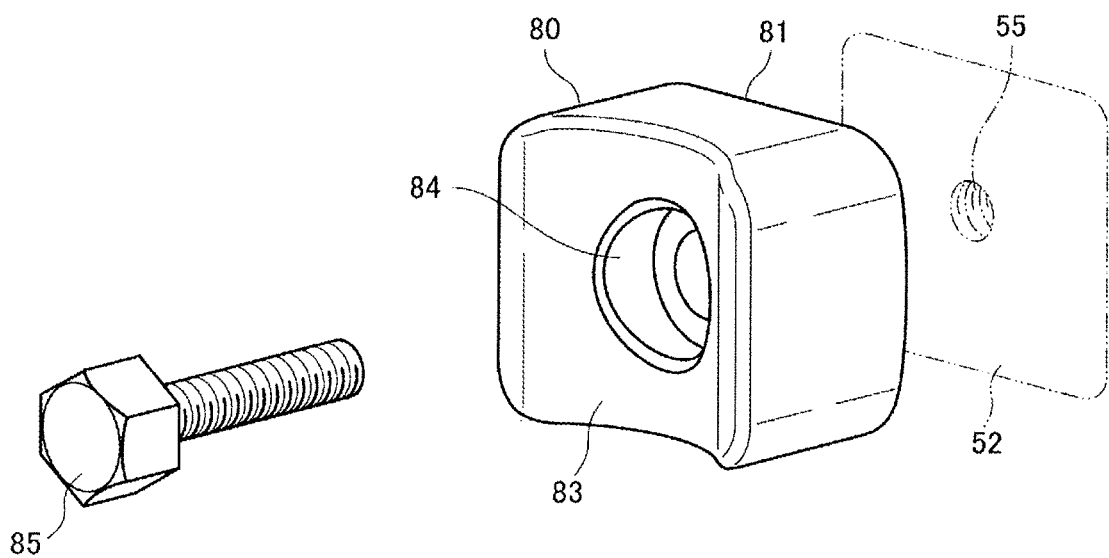
FIGS. 6A and 6B are explanatory perspective views illustrating an overview of a pivoting member according to the second embodiment of the invention.
Figure 6B:
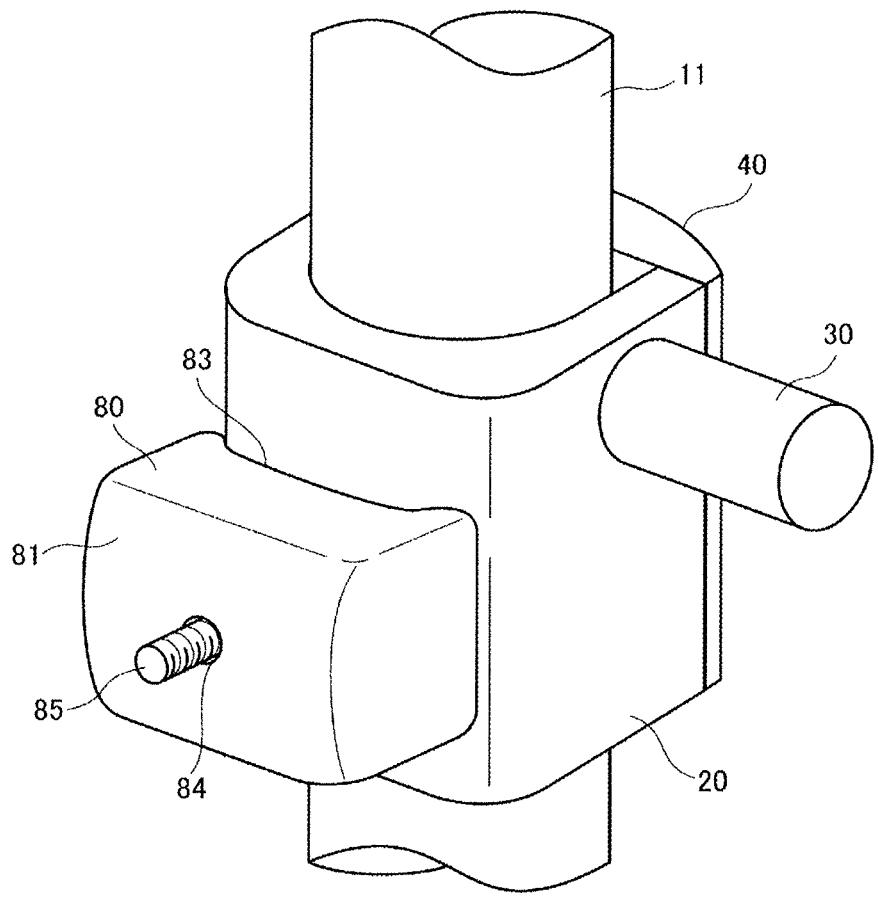

Next, a second embodiment of the invention will be described with reference to the drawings. In the following description, configurations to which the same reference signs as those described in the first embodiment are similar and the description thereof will be omitted in some cases. FIG. 5 is a perspective view illustrating an overview of a cover according to the second embodiment of the invention. FIGS. 6A and 6B are explanatory perspective views illustrating an overview of a pivoting member according to the second embodiment of the invention. FIGS. 7A and 7B are explanatory diagrams illustrating an overview of posture adjustment of an optical fiber preform (a dummy rod) according to the second embodiment of the invention.

In the second embodiment of the invention, a cover 90 that includes adjustment portions 91, 92, and 93 which have a configuration for adjusting a posture of the optical fiber preform 10 of the first embodiment and a pivoting member 80 that enables pivoting at the time of adjusting a posture of the cover 90 are added.

Referring to FIGS. 5 and 7, the cover 90 according to the embodiment includes an enclosure portion 98 that is disposed at a position facing the lid 40 of the adaptor 20 mounted on the optical fiber preform 10. In the enclosure portion 98, a first adjustment portion 91 is disposed on the upper side, and a second adjustment portion 92 and a third adjustment portion 93 are disposed on the lower side. The second adjustment portion 92 and the third adjustment portion 93 are disposed to be mutually substantially right-angled on surfaces perpendicular in the drawing direction. The first adjustment portion 91 is disposed at a position at which the azimuth angle of the second adjustment portion 92 and the third adjustment portion 93 is substantially bisected.

In this way, by including the three adjustment portions 91, 92, and 93 at mutually different azimuth angles, it is possible to appropriately push and pull the optical fiber preform 10 on which the adaptor 20 is mounted in three directions. Therefore, it is possible to adjust a posture of the optical fiber preform 10. That is, it is possible to stabilize a posture by the empty weight of the optical fiber preform 10 and it is possible to minutely adjust an interval between the optical fiber preform 10 and a lateral wall of the drawing furnace in accordance with a change in a thickness or a slight curve of the optical fiber preform 10. The number of adjustment portions, the azimuth angles, and the disposed spots mentioned herein are exemplary and can be appropriately selected in accordance with a space between the drawing furnace and the optical fiber preform 10, the shape of the optical fiber preform 10, or the like. For example, in the foregoing example, one adjustment portion is disposed on the upper side of the enclosure portion 98 and two adjustment portions are disposed on the lower side, but two adjustment portions may be disposed on the upper side and one adjustment portion may be disposed on the lower side.

The adjustment portions 91, 92, and 93 include adjustment screws 94, 95, and 96 moved in each azimuth angle direction by turning. Thus, by stretching the adjustment portions in each azimuth angle direction, it is possible to adjust a posture of the optical fiber preform 10 in which the adaptor 20 is installed. By applying, for example, knurled bolts or wing bolts to the adjustment screws 94, 95, and 96, it is possible to arbitrarily adjust the posture by easily turning the adjustment screws with fingers. In the embodiment, the optical fiber preform 10 in which the adaptor 20 is installed is adjusted, but the posture of the optical fiber preform 10 may be adjusted directly by an adjustment screw. When the optical fiber preform 10 is pushed or pulled directly with the adjustment screw, there is a possibility of a glass member to be hurt. Therefore, it is preferable to realize a structure for pushing or pulling the adaptor 20 using a metal or the like by an adjustment screw.

Referring to FIGS. 6A and 6B, the pivoting member 80 is mounted in a mounting hole 55 formed in the lateral reception surface 52 (also see FIG. 4) of which only a part is illustrated with an imaginary line by a bolt 85. The pivoting member 80 includes a projected contact surface 81 with predetermined curvature in a direction perpendicular to the drawing direction. A depressed optical fiber preform reception surface 83 with curvature of a lateral circumferential surface of the joining mechanism (the adaptor 20) or the dummy rod 11 is formed on a side facing a lateral side of the joining mechanism (the adaptor 20) or the dummy rod 11 of the pivoting member 80. For the pivoting member 80, a material can be appropriately selected in accordance with a heat environment inside the drawing furnace. For example, a metal material such as an austenite-based stainless steel or Inconel can be applied. However, since a spot at which the pivoting member 80 is disposed inside the drawing furnace is not at a high temperature at which glass is melted, a metal such as general stainless steel can also be used. The material is not limited to a metal and quartz or carbon can also be applied.

A stepped hole 84 penetrated to insert the bolt 85 is punched near the middle of the pivoting member 80. The stepped hole 84 is a stepped hole of which a small diameter side is disposed on the side of the contact surface 81 and a large diameter side is disposed on the side of the optical fiber preform reception surface 83. The small diameter is greater than a diameter of a threaded portion of the bolt 85 and is less than the width across flat of a hexagon headed bolt or the diameter of a groove or a holed bolt so that there is a gap on the up, down, right, and left sides with respect to the threaded portion and the head portion of the bolt 85 is not disengaged. On the other hand, the large diameter is formed so that there is a gap on the upper, down, right, and left sides with respect to the width across flat of a hexagon headed bolt or the diameter of a groove or a holed bolt. In this way, the pivoting member 80 is mounted in a state in which the pivoting member 80 is inserted to be loosely fittable in the hanger 50 by the bolt 85, and the mounting hole 53 and the stepped hole 84.

Since the contact surface 81 of the pivoting member 80 has a projected surface with predetermined curvature in a direction perpendicular to the drawing direction on the engagement mechanism side, a pivoting range in the drawing direction can be large along with a loosely-fittable insertion state.

The optical fiber preform reception surface 83 of the pivoting member 80 has a depressed surface in accordance with the curvature of the dummy rod 11 or the joining mechanism (the adaptor 20). When the optical fiber preform 10 is accommodated in the drawing furnace, a closed state between the pivoting member 80 and the dummy rod 11 in which the adaptor 20 is installed is realized by the depressed optical fiber preform reception surface 83. By adjusting the posture of the optical fiber preform 10 by the adjustment portions 91, 92, and 93 while maintaining the closed state, it is possible to minutely adjust the posture without bringing the optical fiber preform 10 into contact with the circumference.

Next, an example of adjustment of a posture of the optical fiber preform 10 will be described with reference to FIGS. 7A and 7B. FIG. 7(A) is a front view when viewed from the side of the cover 90 and a FIG. 7(B) is a partial sectional view taken along the line A-A when viewed from an arrow S of FIG. 7(A). FIGS. 7A and 7B illustrate configurations related to adjustment of a posture, and thus a part of the configuration is omitted.

In the following description, as illustrated in FIG. 7(A), the drawing direction is referred to as the Z axis, a device axis direction of the arm 30 perpendicular to the Z axis is referred to as the Y axis, and a direction perpendicular to the Y and Z axes is referred to as the X axis.

Referring to FIG. 7(A), the optical fiber preform 10 is mounted on the hanger 50 via the arm 30 of the adaptor 20, and thus the cover 90 is mounted on the hanger 50.

In this state, when the adjustment screw 94 of the first adjustment portion 91 is turned to be pushed in the arrow direction, as illustrated in FIG. 7(B), a force F1 (arrow direction) is loaded on a position Z1 of the dummy rod 11. Then, the optical fiber preform 10 can be rotated in a θy direction within a pivotable range in accordance with the loosely-fittable insertion state with the projected contact surface 81 of the pivoting member 80 at a position Z0.

Referring to FIG. 7(A), when the adjustment screw 95 of the second adjustment portion 92 is turned to be pushed in an arrow direction and the adjustment screw 96 of the third adjustment portion 93 is turned to be pushed in an arrow direction, forces F2-1 and F2-2 at azimuth angles perpendicular to each other are loaded on a position Z2 of the dummy rod 11. Then, the optical fiber preform 10 can be rotated in the θy direction or a θx direction within a pivotable range in accordance with the loosely-fittable insertion state with the projected contact surface 81 of the pivoting member 80 at the position Z0.

In this way, by disposing the adjustment portions 91, 92, and 93 at positions at which the azimuth angles are different above and below the pivotable configuration and adjusting the forces F1, F2-1, and F2-2 using the adjustment portions 91, 92, and 93, it is possible to minutely adjust θx and θy. By minutely adjusting θx and θy, the optical fiber preform 10 can be at an appropriate posture.

In the embodiment, the example in which the adjustment portions are located at three spots has been described, but the invention is not limited thereto. The number or positions of the spots of the adjustment portions can be appropriately set in accordance with a space near the drawing furnace or accessibility at the time of adjustment, that is, whether to reach the adjustment portion with a finger in the case of manual adjustment, whether to easily perform the adjustment in the case of adjustment using a tool or the like.

Description of Third Embodiment of the Invention

Figure 8:
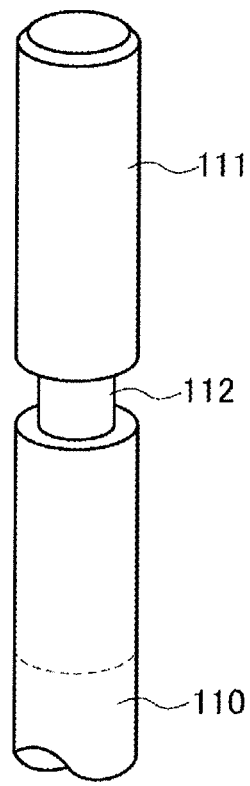
FIG. 8 is a perspective view illustrating an overview of a dummy rod on an upper side of an optical fiber preform according to a third embodiment of the invention.
Figure 9:
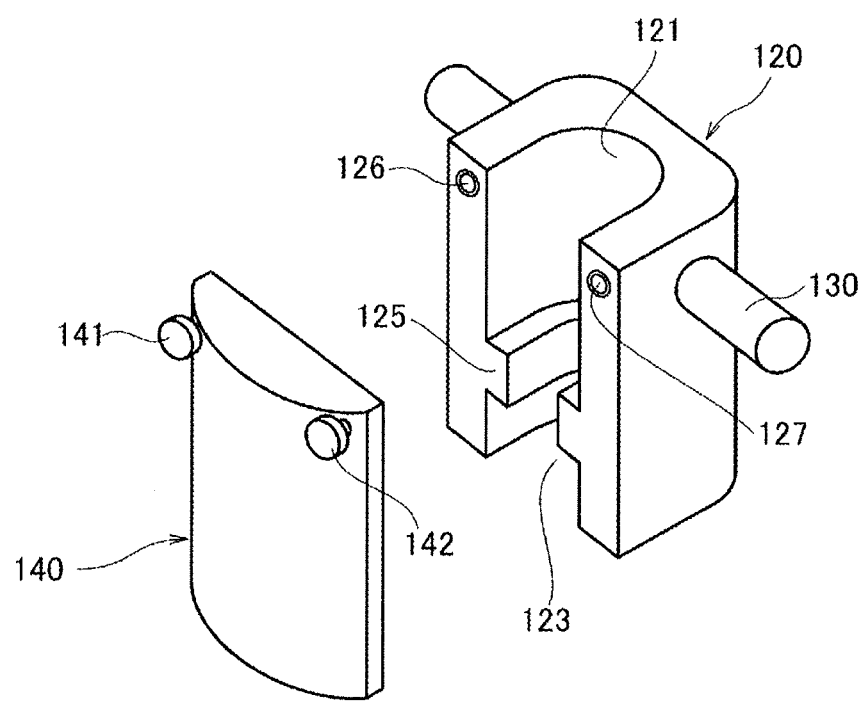
FIG. 9 is a perspective view illustrating an overview of an adaptor (a joining mechanism) according to the third embodiment of the invention.
Figure 10:
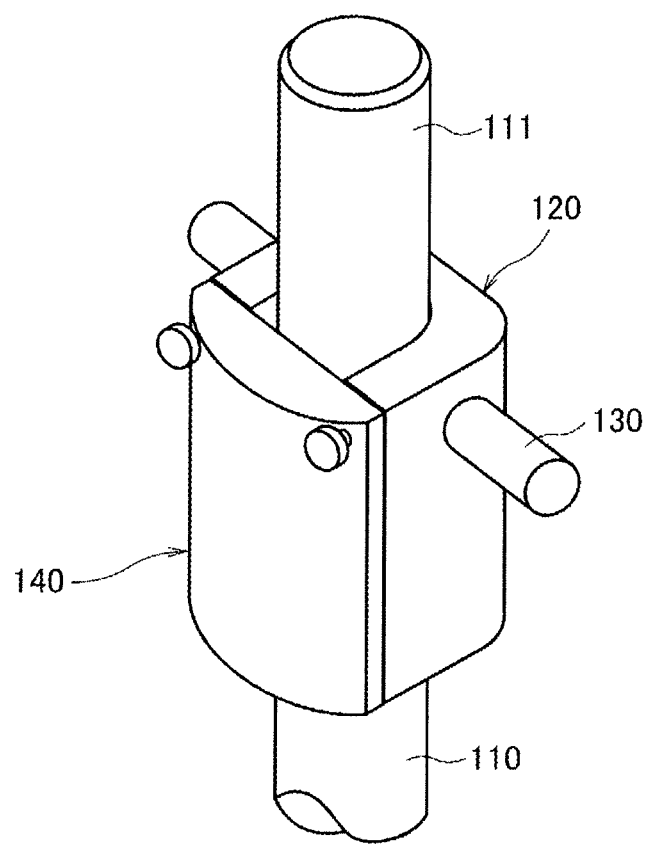
FIG. 10 is an explanatory diagram illustrating a state in which the adaptor (the joining mechanism) is mounted in the optical fiber preform (the dummy rod) according to the third embodiment of the invention.

Next, a third embodiment of the invention will be described with reference to the drawings. In the following description, configurations to which the same reference signs as those described in the first or second embodiment are similar and the description thereof will be omitted in some cases. FIG. 8 is a perspective view illustrating an overview of a dummy rod on an upper side of an optical fiber preform according to the third embodiment of the invention. FIG. 9 is a perspective view illustrating an overview of an adaptor (a joining mechanism) according to the third embodiment of the invention. FIG. 10 is an explanatory diagram illustrating a state in which the adaptor (the joining mechanism) is mounted in the optical fiber preform (the dummy rod) according to the third embodiment of the invention.

The third embodiment of the invention is different from the first embodiment in joining between the optical fiber preform and the adaptor (the joining mechanism), and the engagement with the hanger (the engagement mechanism) (the first embodiment) or the posture adjustment of the optical fiber preform (the second embodiment) are the same as the configuration described in the first or second embodiment, and thus the description thereof will be omitted.

In the third embodiment of the invention, a suspension structure includes an adaptor 120 (a joining mechanism) mounted in a dummy rod 111 which is connected on an upper side of an optical fiber preform 110 and a hanger 50 (an engagement mechanism) with which the adaptor 120 engages. The cover 70 (the cover portion) that covers the adaptor 120 and the dummy rod 111 after the dummy road 111 is accommodated in the hanger 50 may be included.

In the dummy rod 111, an annular depression 112 (a suspension portion) is formed in a direction perpendicular to the vertical direction of FIG. 8. Any shape may be formed as long as a stepped difference occurs in the depressed groove. The invention is not limited to a rectangular groove in a sectional view as in FIG. 8, and a semicircular shape may be used in a sectional view. Further, the depressed groove may not be formed on the whole circumference and may be uniformly on the circumference. For example, the depressed groove may be formed at two parts at least to face each other.

Referring to FIG. 9, the adaptor 120 covers at least a part of circumference of the dummy rod 111 and includes an arm 130 extending on both sides in a direction perpendicular to the drawing direction and a retention portion 125 that engages with the annular depression 112 (the suspension portion) and retains the optical fiber preform 110. A lid 140 that prevents the optical fiber preform 110 from falling is mounted on the adaptor 120 after the dummy rod 111 is accommodated.

The arm 130 is a cylindrical member and engages with the gripping portion 60 of the hanger 50 when the adaptor 120 is accommodated in the hanger 50, as described in the first embodiment. The position of the arm 130 is disposed above the retention portion 125 in FIG. 9, but is not limited to a position above the retention portion 125. For example, the position of the arm 130 may be at the same height as the retention portion 125 or may be below the retention portion 125.

The adaptor 120 includes a dummy rod accommodation portion 121 that accommodates the dummy road 111 of the optical fiber preform 110 from a lateral surface. In the dummy rod accommodation portion 121, a curved surface that has an inner diameter substantially matching the outer diameter of the dummy rod 111 of the optical fiber preform 110 is formed. The curved surface is formed in, for example, a semicircular shape so that the dummy rod 111 of the optical fiber preform 110 enters the dummy rod accommodation portion 121 from an opening 123 and subsequently becomes stable to be accommodated. In the dummy rod accommodation portion 121, the retention portion 125 which is an annular depressed groove with the shape matching the annular depression 112 is formed.

After the dummy rod 111 is accommodated, the lid 140 is mounted on the adaptor 120 to prevent the optical fiber preform 110 from falling. The lid 140 is installed in mounting holes 126 and 127 of the adaptor 120 by locking screws 141 and 142.

A material of the adaptor 120 and the lid 140 is similar to that of the first embodiment.

A state in which the optical fiber preform 110 is mounted on the adaptor 120 will be described with reference to FIGS. 8 to 10. First, the adaptor 120 is moved toward the dummy rod 111 of the optical fiber preform 110. Subsequently, the annular depression 112 formed in the dummy rod 111 is fitted in the retention portion 125 of the adaptor 120 so that the dummy rod 111 is accommodated in the dummy rod accommodation portion 121. Thereafter, the lid 140 is installed in the mounting holes 126 and 127 of the adaptor 120 by the locking screws 141 and 142. Then, the optical fiber preform 110 engages with the adaptor 120 as in FIG. 10.

According to the embodiment, by retaining the optical fiber preform 110 in the adaptor 120 (the engagement mechanism) including the arm 130 using the suspension portion 112 formed in the groove shape formed on the upper side of the optical fiber preform 110 in advance, it is possible to engage with the engagement mechanism using the arm with sufficient strength. Therefore, it is possible to easily perform work for conveying the optical fiber preform and it is possible to reliably dispose the optical fiber preform inside the drawing furnace.

Description of Fourth Embodiment of the Invention

Figure 11:
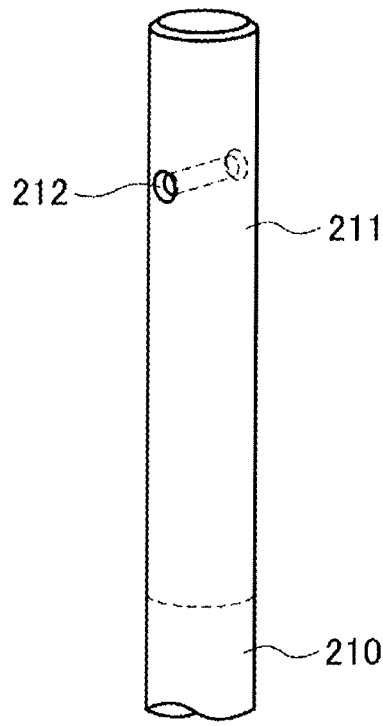
FIG. 11 is a perspective view illustrating an overview of a dummy rod on an upper side of an optical fiber preform according to a fourth embodiment of the invention.
Figure 12:
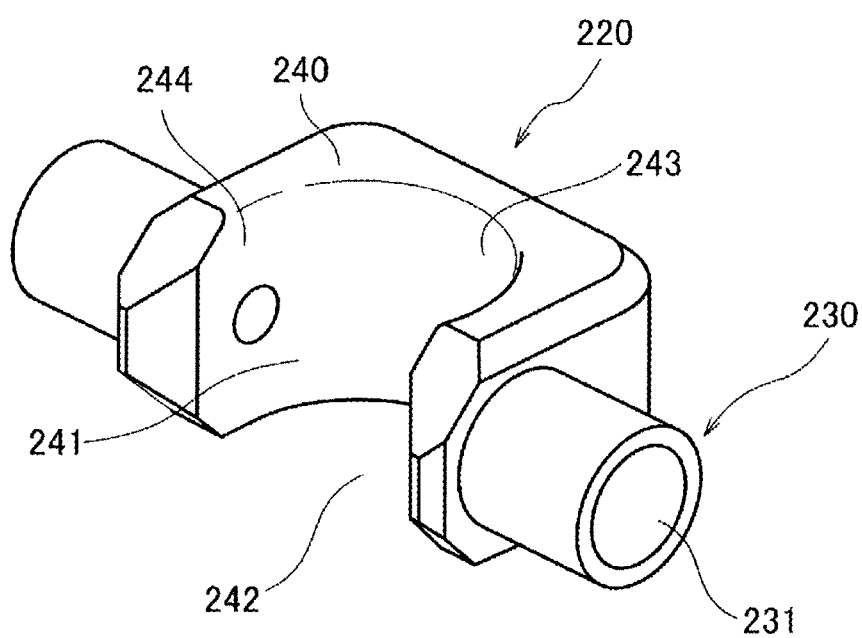
FIG. 12 is a perspective view illustrating an overview of an adaptor (a joining mechanism) according to the fourth embodiment of the invention.
Figure 13C:
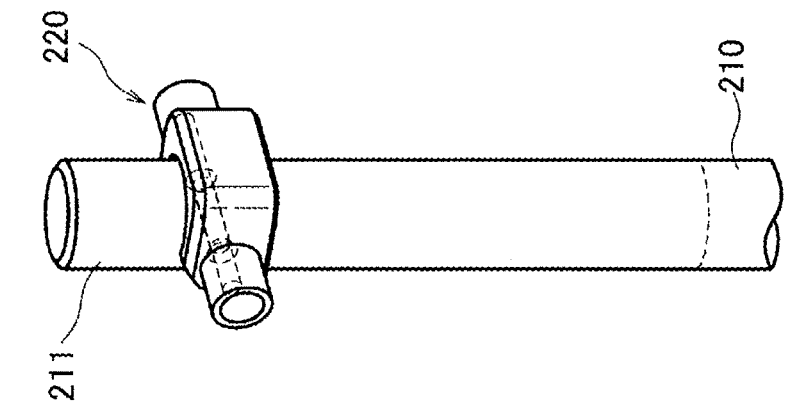
FIGS. 13A, 13B and 13C are explanatory diagrams illustrating a procedure for mounting the adaptor (the joining mechanism) in the optical fiber preform (the dummy rod) according to the fourth embodiment of the invention.
Figure 13B:
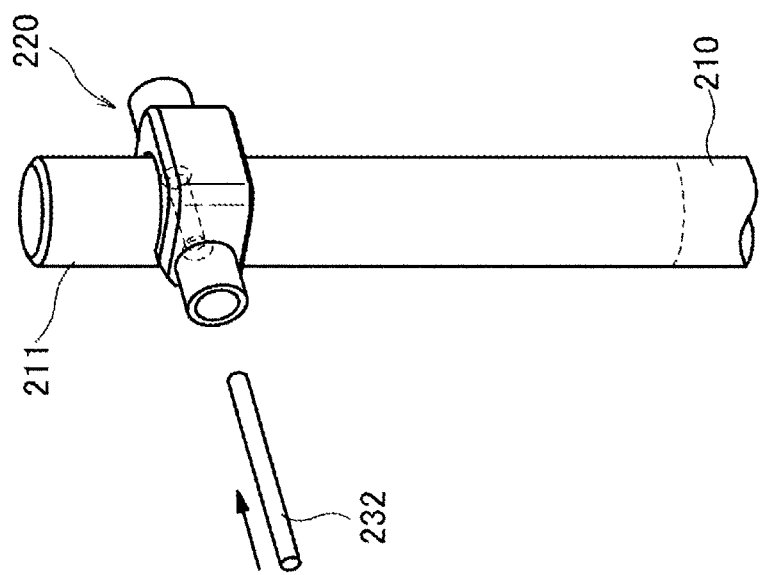
Figure 13A:
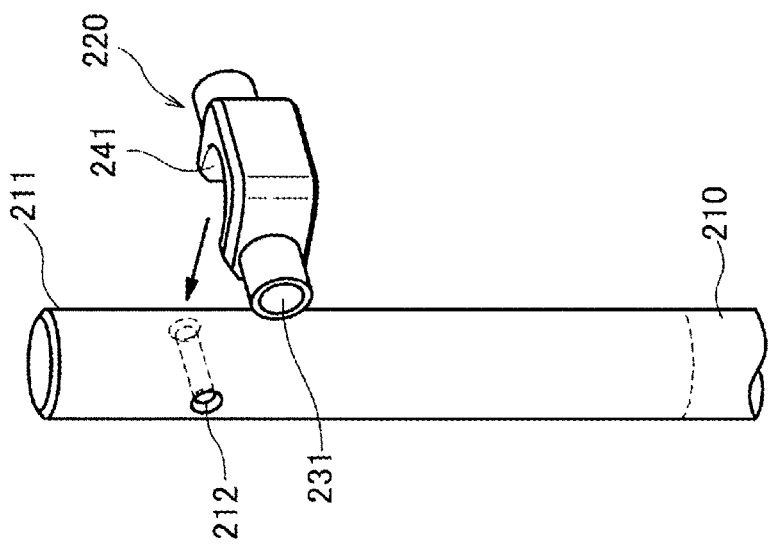

Next, a fourth embodiment of the invention will be described with reference to the drawings. In the following description, configurations to which the same reference signs as those described in the first to third embodiment are similar and the description thereof will be omitted in some cases. FIG. 11 is a perspective view illustrating an overview of a dummy rod on an upper side of an optical fiber preform according to the fourth embodiment of the invention. FIG. 12 is a perspective view illustrating an overview of an adaptor (a joining mechanism) according to the fourth embodiment of the invention. FIGS. 13A, 13B and 13C are explanatory diagrams illustrating a procedure for mounting the adaptor (the joining mechanism) in the optical fiber preform (the dummy rod) according to the fourth embodiment of the invention.

The fourth embodiment of the invention is different from the first and third embodiment in joining between the optical fiber preform and the adaptor (the joining mechanism), and the engagement with the hanger (the engagement mechanism) (the first embodiment) or the posture adjustment of the optical fiber preform (the second embodiment) are the same as the configuration described in the first or second embodiment, and thus the description thereof will be omitted.

In the fourth embodiment of the invention, a suspension structure includes an adaptor 220 (a joining mechanism) mounted in a dummy rod 211 which is connected on an upper side of an optical fiber preform 210 and a hanger 50 (an engagement mechanism) with which the adaptor 220 engages. The cover 70 (the cover portion) that covers the adaptor 220 and the dummy rod 211 after the dummy road 211 is accommodated in the hanger 50 may be included. In the dummy rod 211, a through depression 212 (a suspension portion) is formed in a direction perpendicular to the vertical direction of FIG. 11.

Referring to FIG. 12, the adaptor 220 includes two arms 230 that each extend on both sides of the through hole 212 of the dummy rod 211 and include a guide hole 231 communicating with an opening of a through hole 212 and a connection member 240 that covers at least parts of the circumference of the dummy rod 11 and connects the arms 230 on both sides to each other.

The connection member 240 connects the two arms 230 at both ends to each other and includes a dummy rod accommodation portion 241 that accommodates the dummy rod 211 of the optical fiber preform 210 on a lateral surface. The dummy rod accommodation portion 241 is set as a semicircular portion 243 so that a curved surface with an internal diameter substantially matching the outer diameter of the dummy rod 211 of the optical fiber preform 210 is formed and the curved surface serves as an opening 242 for allowing the dummy rod 211 of the optical fiber preform 210 to enter the dummy rod accommodation portion 241. A straight portion 244 extending in a tangential line shape is formed from an end of the semicircular portion 243 and the arm 230 is connected to the straight portion 244 and a part of the semicircular portion 243.

The guide holes 231 are punched to communicate with the through hole 212 of the dummy rod 211 and are formed so that the centers of the guide holes 231 punched in the two arms 230 match each other.

A procedure in which the adaptor 220 is mounted on the optical fiber preform 210 will be described with reference to FIGS. 13A, 13B and 13C. First, the adaptor 220 is moved toward the dummy rod 211 of the optical fiber preform 210 in a direction indicated by an arrow in FIG. 13(A). Subsequently, as in FIG. 13(B), dummy rod 211 is accommodated in the dummy rod accommodation portion 241 so that the through hole 212 formed in the dummy rod 211 communicates with the guide hole 231 of the adaptor 220. Thereafter, a pin 232 (a retention portion) is inserted from the guide hole 231 and the pin 232 is accommodated in the through hole 212 and the guide holes 231 of the arms 230 on both sides. Then, the optical fiber preform 210 engages with the adaptor 220 as in FIG. 13(C).

By engaging the dummy rod 211 with the adaptor 220 as in FIG. 13(C), the optical fiber preform 210 can be supported by the adaptor 220 with sufficient strength. Thus, it is possible to prevent falling or the like at the time of conveyance into the drawing furnace and maintain the stable state even in the drawing furnace.

According to the embodiment, by using the through hole as the suspension portion and using the pin inserted into the through hole as the retention portion, it is possible to engage the joining mechanism with the through hole of the dummy rod connected on the upper side of the optical fiber preform in advance by the pin. Since the engagement mechanism can engage using the arms with sufficient strength in the configuration, it is possible to easily perform work for conveying the optical fiber preform and it is possible to reliably dispose the optical fiber preform inside the drawing furnace. It is possible to realize a configuration in which the size of the adaptor can be less than in the first and third embodiment, and the lid is not necessary.

Description of Fifth Embodiment of the Invention

Figure 14:
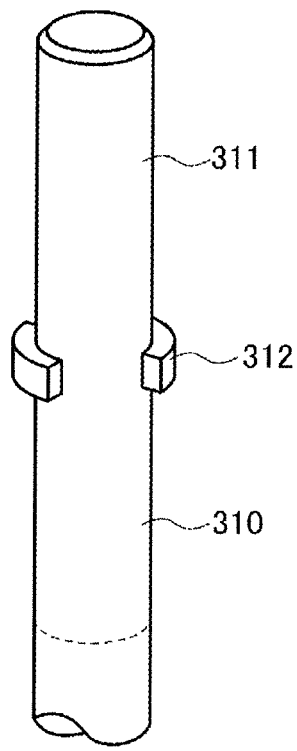
FIG. 14 is a perspective view illustrating an overview of a dummy rod on an upper side of an optical fiber preform according to a fifth embodiment of the invention.
Figure 15:
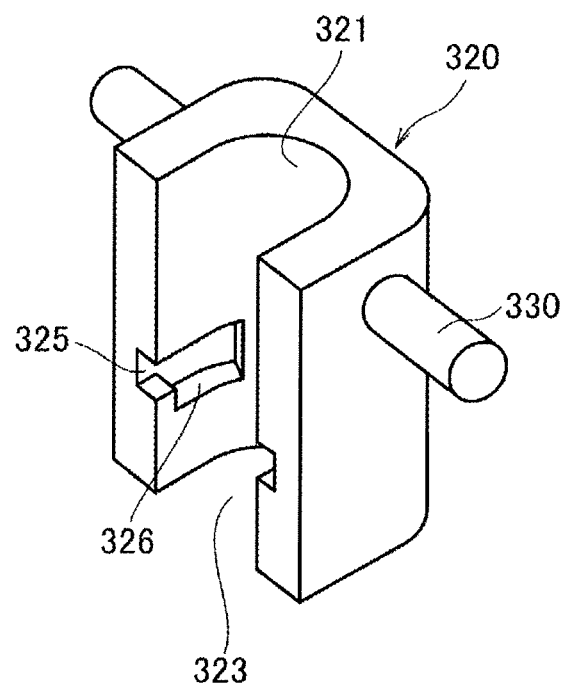
FIG. 15 is a perspective view illustrating an overview of an adaptor (a joining mechanism) according to the fifth embodiment of the invention.

Next, a fifth embodiment of the invention will be described with reference to the drawings. In the following description, configurations to which the same reference signs as those described in the first to fourth embodiment are similar and the description thereof will be omitted in some cases. FIG. 14 is a perspective view illustrating an overview of a dummy rod on an upper side of an optical fiber preform according to a fifth embodiment of the invention. FIG. 15 is a perspective view illustrating an overview of an adaptor (a joining mechanism) according to the fifth embodiment of the invention.

The fifth embodiment of the invention is different from the first, third, and fourth embodiments in joining between the optical fiber preform and the adaptor (the joining mechanism), and the engagement with the hanger (the engagement mechanism) (the first embodiment) or the posture adjustment of the optical fiber preform (the second embodiment) are the same as the configuration described in the first or second embodiment, and thus the description thereof will be omitted.

In the fifth embodiment of the invention, a suspension structure includes an adaptor 320 (a joining mechanism) mounted in a dummy rod 311 which is connected on an upper side of an optical fiber preform 310 and a hanger 50 (an engagement mechanism) with which the adaptor 320 engages. The cover 70 (the cover portion) that covers the adaptor 320 and the dummy rod 311 after the dummy road 311 is accommodated in the hanger 50 may be included.

In the dummy rod 311, external circumferential projections 312 (suspension portions) are formed at two facing spots on the circumference in a direction perpendicular to the vertical direction of FIG. 14. Any shape may be formed as long as a stepped difference occurs in the projected groove. The invention is not limited to a rectangular groove in a sectional view as in FIG. 14, and a semicircular shape may be used in a sectional view.

Referring to FIG. 15, the adaptor 320 covers at least a part of circumference of the dummy rod 311 and includes arms 330 extending on both sides in a direction perpendicular to the drawing direction and retention portions 325 that engage with the external circumferential projection 312 (the suspension portion) and retain the optical fiber preform 310.

The adaptor 320 includes a dummy rod accommodation portion 321 that accommodates the dummy road 311 of the optical fiber preform 310 from a lateral surface. In the dummy rod accommodation portion 321, a curved surface that has an inner diameter substantially matching the outer diameter of the dummy rod 311 of the optical fiber preform 310 is formed. The curved surface is formed in, for example, a semicircular shape so that the dummy rod 311 of the optical fiber preform 310 enters the dummy rod accommodation portion 321 from an opening 323 and subsequently becomes stable to be accommodated. In the dummy rod accommodation portion 321, the retention portions 325 which are annular projected grooves with the shapes matching the external circumferential projections 312 are formed at two positions facing on the circumference.

In the retention portion 325, a space 326 serving as a stepped difference is formed on the back side in an entering direction to the dummy rod accommodation portion 321. The external circumferential projected portion 312 is fitted in to the space 326.

According to the embodiment, there are the stepped differences in the retention portions 325. By accommodating the external circumferential projections 312 in the spaces 326 on the lower sides of the stepped differences, it is possible to prevent the optical fiber preform 310 from falling due to vibration or the like. Therefore, it is possible to retain the optical fiber preform 310 without providing the lid.

The embodiments have been described above, but the modes for the invention are not limited to the foregoing embodiments and can be modified within the scope of the invention departing from the gist of the invention.

REFERENCE SIGNS LIST

1: support rod
10, 110, 210, 310: optical fiber preform
11, 111, 211, 311: dummy rod
20, 120, 220, 320: adaptor
30, 130, 230, 330: arm
40, 140: lid
50: hanger
51: accommodation portion
52: lateral reception surface
53, 55: mounting hole
60: gripping portion
62: placement portion
70, 90: cover
71: locking screw
75: buffer member
80: pivoting member
81: contact surface
83: optical fiber preform reception surface
84: stepped hole
85: bolt
91: first adjustment portion
92: second adjustment portion
93: third adjustment portion
94, 95, 96: adjustment screw
98: enclosure portion
100: suspension structure
212: through hole
231: guide hole
232: pin
240: connection member
241: dummy rod accommodation portion
242: opening
243: semicircular portion
244: straight portion

The invention claimed is:

1. A suspension structure that conveys an optical fiber preform into a drawing furnace comprising:
a suspension portion formed in a depressed shape or a projected shape or as a hole is formed in a dummy rod connected on an upper side of the optical fiber preform conveyed into the drawing furnace;
a joining mechanism configured to cover at least a part of circumference of the dummy rod and include an arm that extends on both sides in a direction perpendicular to a drawing direction and a retention portion that engages with the suspension portion and retains the optical fiber preform; and
an engagement mechanism including a gripping portion with which the arm engages and which hangs the optical fiber preform, wherein
the engagement mechanism includes an accommodation portion that is mounted at a lower end of the support rod hung in advance in the drawing furnace and accommodates a part of the joining mechanism with which the optical fiber preform engages, and
the gripping portion includes a placement portion in which the arm is placed and a locking portion which extends on both sides of the accommodation portion, of which a tip is formed in a key shape, and which locks the accommodated joining mechanism.

2. The suspension structure according to claim 1, wherein the suspension portion has an annular projected or spherical shape formed uniformly on the dummy rod, and the annular shape or the spherical shape is fitted in the retention portion.

3. The suspension structure according to claim 1, wherein the suspension portion is a depressed groove formed uniformly on the dummy rod, and the retention portion is fitted in the groove.

4. The suspension structure according to claim 1, wherein the suspension portion is a through hole,
the through hole is formed to be perpendicular to the drawing direction of the dummy rod connected on the upper side of the optical fiber preform conveyed into the drawing furnace,
a guide hole communicating with the through hole is formed in the arm, and
the retention portion is a pin inserted into the through hole and the guide hole.

5. A method of manufacturing an optical fiber, the method comprising:
suspending an optical fiber preform using the suspension structure according claim 1;
inserting the optical fiber preform into a drawing furnace; and
heating and melting the optical fiber preform in the drawing furnace to draw an optical fiber.

6. A suspension structure according to claim 1 that conveys an optical fiber preform into a drawing furnace comprising:
a suspension portion formed in a depressed shape or a projected shape or as a hole is formed in a dummy rod connected on an upper side of the optical fiber preform conveyed into the drawing furnace;
a joining mechanism configured to cover at least a part of circumference of the dummy rod and include an arm that extends on both sides in a direction perpendicular to a drawing direction and a retention portion that engages with the suspension portion and retains the optical fiber preform; and
an engagement mechanism including a gripping portion with which the arm engages and which hangs the optical fiber preform, wherein
lateral reception surface facing a lateral surface of the dummy rod is formed in the engagement mechanism,
a pivoting member that has projected surface with predetermined curvature in a direction perpendicular to the drawing direction is mounted to be pivotable on the engagement mechanism so that the projected surface comes into contact with the lateral reception surface, and
a depressed optical fiber preform reception surface with curvature of a lateral circumferential surface of the joining mechanism or the dummy rod is formed on a side facing a lateral side of the joining mechanism or the dummy rod of the pivoting member.

7. The suspension structure according to claim 6, wherein the pivoting member is inserted to be loosely fitted in the engagement mechanism.

8. A method of manufacturing an optical fiber, the method comprising:
suspending an optical fiber preform using the suspension structure according claim 6;
inserting the optical fiber preform into a drawing furnace; and
heating and melting the optical fiber preform in the drawing furnace to draw an optical fiber.

9. A suspension structure that conveys an optical fiber preform into a drawing furnace comprising:
a suspension portion formed in a depressed shape or a projected shape or as a hole is formed in a dummy rod connected on an upper side of the optical fiber preform conveyed into the drawing furnace;
a joining mechanism configured to cover at least a part of circumference of the dummy rod and include an arm that extends on both sides in a direction perpendicular to a drawing direction and a retention portion that engages with the suspension portion and retains the optical fiber preform;
an engagement mechanism including a gripping portion with which the arm engages and which hangs the optical fiber preform; and
a cover portion configured to cover the joining mechanism engaging with the engagement mechanism and to be installed in the engagement mechanism.

10. The suspension structure according to claim 9, wherein
the cover portion includes an enclosure portion facing a lateral surface of the optical fiber preform, and
the enclosure portion includes an adjustment portion that stretches in mutually different azimuth angle directions in the drawing direction and adjusts a posture of the optical fiber preform.

11. The suspension structure according to claim 10, wherein
the adjustment portion is disposed above or below the arm in the drawing direction.

12. The suspension structure according to claim 10, wherein
at least three adjustment portions are included and two of the adjustment portions are disposed above or below the arm so that the adjustment portions have substantially right angled azimuth angles, and
the one adjustment portion is disposed above or below the arm so that the adjustment portion has a substantially middle azimuth angle with respect to the two adjustment portions.

13. The suspension structure according to claim 10, wherein
the adjustment portion is a screw movable in the azimuth angle direction by turning.

14. The suspension structure according to claim 9, wherein
a buffer member is included one or both of a side of the joining mechanism facing the engagement mechanism and a side of the cover facing the joining mechanism.

15. A method of manufacturing an optical fiber, the method comprising:
suspending an optical fiber preform using the suspension structure according claim 9;
inserting the optical fiber preform into a drawing furnace; and
heating and melting the optical fiber preform in the drawing furnace to draw an optical fiber.

* * * * *